US012276562B2

(12) United States Patent
Yabu et al.

(10) Patent No.: US 12,276,562 B2
(45) Date of Patent: Apr. 15, 2025

(54) PRESSURE SENSOR LAYOUT STRUCTURE

(71) Applicant: HONDA MOTOR CO., LTD., Tokyo (JP)

(72) Inventors: Tomoya Yabu, Tokyo (JP); Tatsuya Ishizaki, Tokyo (JP); Junya Harada, Tokyo (JP); Yoshihisa Sugamata, Tokyo (JP); Hiroyuki Mae, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 17/988,012

(22) Filed: Nov. 16, 2022

(65) Prior Publication Data
US 2023/0152174 A1  May 18, 2023

(30) Foreign Application Priority Data
Nov. 18, 2021  (JP) .................................. 2021-187494

(51) Int. Cl.
| | | |
|---|---|---|
| *G01L 7/04* | (2006.01) | |
| *G01L 5/00* | (2006.01) | |
| *B60R 19/48* | (2006.01) | |

(52) U.S. Cl.
CPC ............ *G01L 7/041* (2013.01); *G01L 5/0052* (2013.01); *B60R 19/48* (2013.01)

(58) Field of Classification Search
CPC ......... G01L 7/041; G01L 5/0052; G01L 1/02; G01L 19/0023; B60R 19/48; B60R 2019/186; B60R 19/18; B60R 19/483
See application file for complete search history.

(56) References Cited

U.S. PATENT DOCUMENTS

| | | |
|---|---|---|
| 8,910,986 B1 | 12/2014 | Appukutty et al. |
| 2015/0097385 A1 | 4/2015 | Appukutty et al. |
| 2015/0274118 A1 | 10/2015 | Schondorf et al. |
| 2015/0274119 A1 | 10/2015 | Schondorf et al. |
| 2016/0039376 A1* | 2/2016 | Narita ..................... B60R 19/18 293/4 |
| 2017/0043735 A1* | 2/2017 | Yamaguchi ............. B60R 19/18 |
| 2018/0272971 A1* | 9/2018 | Syvertsen ........... B60R 21/0136 |
| 2020/0223384 A1 | 7/2020 | Kim et al. |
| 2020/0262376 A1 | 8/2020 | Aizawa et al. |

(Continued)

FOREIGN PATENT DOCUMENTS

| | | |
|---|---|---|
| CN | 104512364 A | 4/2015 |
| CN | 104943641 A | 9/2015 |

(Continued)

OTHER PUBLICATIONS

Chinese Office Action received in corresponding Chinese application No. 202211319788.3 dated Jan. 26, 2025 with English translation (15 pages).

*Primary Examiner* — Francis C Gray
(74) *Attorney, Agent, or Firm* — Rankin, Hill & Clark LLP

(57) ABSTRACT

A pressure sensor layout structure includes: a bumper beam; an absorber disposed at a front of the bumper beam; a pressure tube arranged between the bumper beam and the absorber; a pressure sensor attached to an end of the pressure tube; and a sensor cover fixed to a rear surface of the absorber, wherein the sensor cover is fixed to an end portion in a vehicle width direction of the absorber, at two or more positions which are located variously in the vehicle width direction.

8 Claims, 6 Drawing Sheets

(56) References Cited

U.S. PATENT DOCUMENTS

2021/0031715 A1* 2/2021 Palazzolo ............ G05D 1/0055
2021/0094495 A1* 4/2021 Park .................... B60R 21/0136

FOREIGN PATENT DOCUMENTS

| CN | 110891828 A | 3/2020 |
| CN | 111572483 A | 8/2020 |
| CN | 113474222 A | 10/2021 |

* cited by examiner

PRESSURE SENSOR LAYOUT STRUCTURE

CROSS-REFERENCE TO RELATED APPLICATION

This application claims the benefit of priority to Japanese Patent Application No. 2021-187494 filed on Nov. 18, 2021, the disclosures of all of which are hereby incorporated by reference in their entireties.

TECHNICAL FIELD

The present invention relates to a pressure sensor layout structure of a vehicle.

BACKGROUND OF THE INVENTION

A structure has been known, as a pressure sensor layout structure of a vehicle, that includes a bumper reinforcement (bumper beam) extending in a vehicle width direction, an absorber made of foam resin and attached to a front of the bumper reinforcement via a bracket, a pressure tube extending in the vehicle width direction along a rear surface of the absorber, and pressure sensors installed at both ends of the pressure tube (see Japanese Patent No. 6070647 (hereinbelow, referred to as Patent Document 1), for example). In this pressure sensor layout structure, the pressure sensors detect pressure changes in the pressure tube at a time of collision of a vehicle and output detection signals to an electronic control unit. The electronic control unit calculates a collision load, effective mass of a collided object, and the like, based on the detection signals. The electronic control unit determines, based on calculation results, whether a command to deploy an airbag should be outputted or not, for example.

SUMMARY

Problems to be Solved

However, a conventional pressure sensor layout structure (see, Patent Document 1, for example) has a risk of the absorber being cut off at an end in the vehicle width direction thereof when the vehicle has had an offset collision. If the absorber is cut off at an end thereof, the pressure sensors cannot accurately detect pressure changes in the pressure tube at a time of a collision.

The present invention is therefore intended to provide a pressure sensor layout structure that allows a pressure sensor to accurately and stably detect a pressure change in a pressure tube even at an offset collision of a vehicle, to further enhance traffic safety.

Solution to Problem

A pressure sensor layout structure to solve the above-identified problem includes: a bumper beam; an absorber disposed at a front of the bumper beam; a pressure tube arranged between the bumper beam and the absorber; a pressure sensor attached to an end of the pressure tube; and a sensor cover fixed to a rear surface of the absorber, wherein the sensor cover is fixed to an end portion in a vehicle width direction of the absorber, at two or more positions which are located variously in the vehicle width direction.

Advantageous Effects of the Invention

The present invention provides a pressure sensor layout structure that allows the pressure sensor to accurately and stably detect a pressure change in the pressure tube even at an offset collision of the vehicle, to further enhance traffic safety.

DETAILED DESCRIPTION

Figure 1:
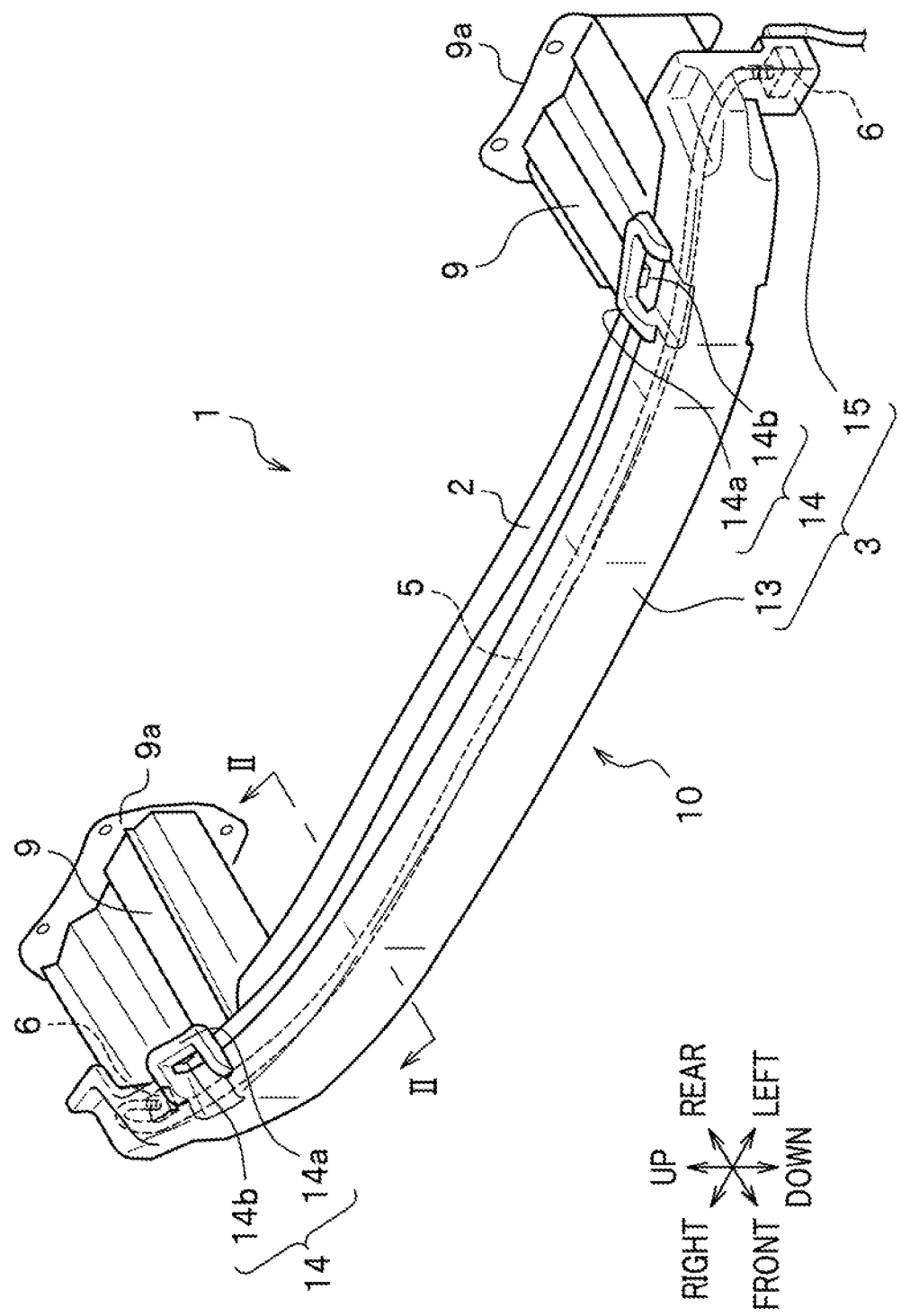
FIG. 1 is an overall perspective view of a pressure sensor layout structure according to an embodiment of the present invention.

Hereinafter, a description is given in detail of an embodiment of a pressure sensor layout structure according to the present invention, with reference to the drawings as required. Note that a front-rear direction, an up-down direction, and a right-left direction in the following description are based on the arrowed directions in the drawings aligned with a front-rear direction, an up-down direction, and a right-left direction of a vehicle.

Figure 2:
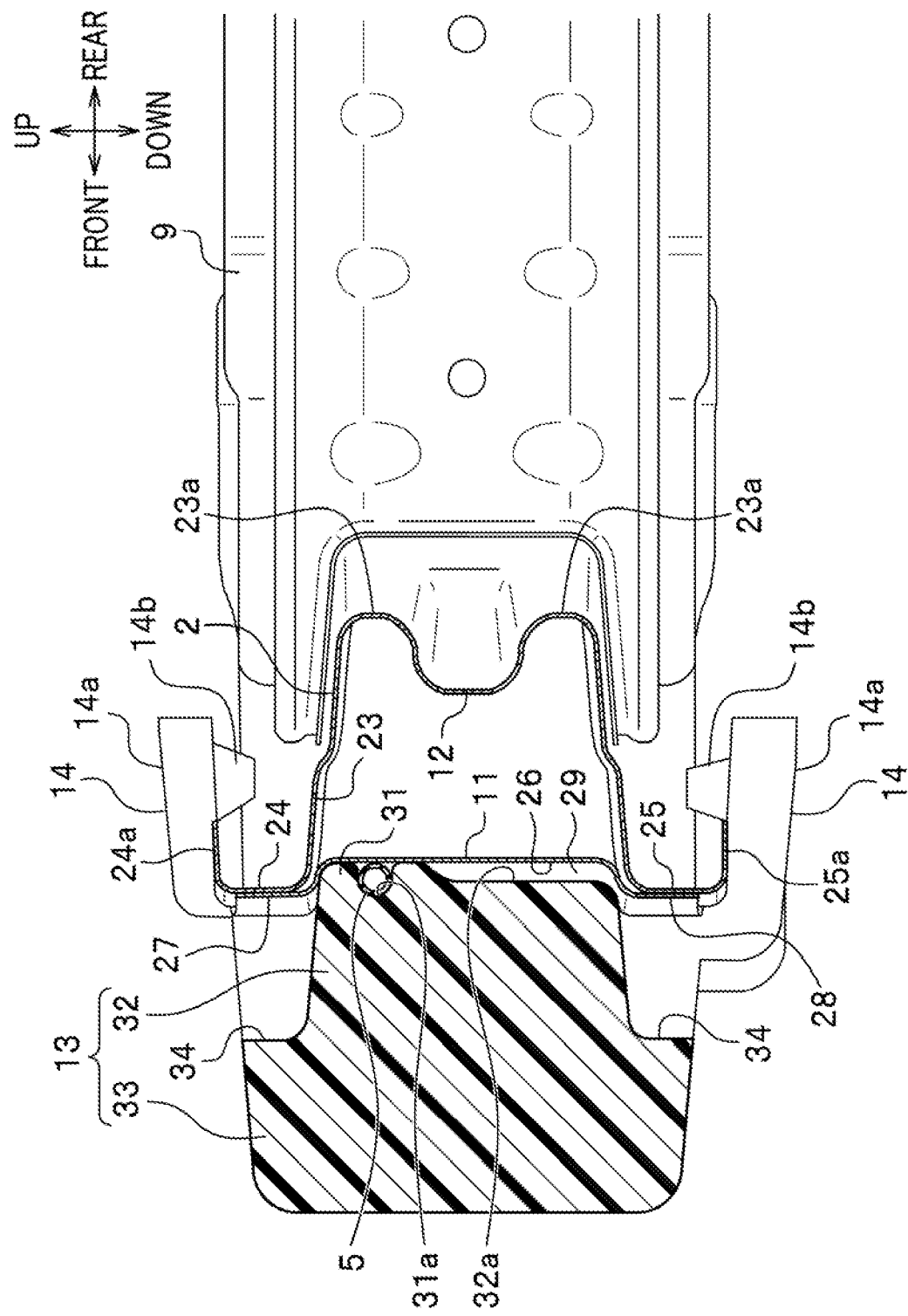
FIG. 2 is a cross-sectional view of the pressure sensor layout structure, taken along a line II-II in FIG. 1.

FIG. 1 is an overall perspective view of a pressure sensor layout structure according to the embodiment. FIG. 2 is a cross-sectional view of the pressure sensor layout structure, taken along a line II-II in FIG. 1. Note that a pressure tube 5 and pressure sensors 6 are indicated by hidden lines (dotted lines) in FIG. 1.

As shown in FIG. 1, a pressure sensor layout structure 1 is assembled in a front bumper 10 of a vehicle. In particular, the pressure sensor layout structure 1 includes a bumper beam 2, an absorber 3, the pressure tube 5, the pressure sensors 6, and a sensor cover 8 (see FIG. 3) to be described below.

<<Bumper Beam>>

The bumper beam 2 is a frame member of the front bumper 10 arranged at a front of the vehicle so as to extend in a vehicle width direction. The bumper beam 2 is in a substantially bow shape, convex forward in a planar view. In particular, the bumper beam 2 extends substantially linearly at the center in the vehicle width direction, and is curved so as to be gradually displaced rearward from the center toward an outer side in the vehicle width direction.

As shown in FIG. 2, the bumper beam 2 has a closed cross-sectional structure with a front member 11, in a plate shape in a cross-sectional view, joined with a rear member 12, in a hat shape in a cross-sectional view. The front member 11 has a flat vertical wall 26 corresponding to a bottom of the plate shape, an upper wall 27 formed to correspond to an upper edge of the plate shape and extending upward from an upper end of the vertical wall 26, and a lower wall 28 formed to correspond to a lower edge of the plate shape and extending downward from a lower end of the vertical wall 26, with the upper and lower walls 27, 28 each shifted forward with respect to the vertical wall 26 to form a step with the vertical wall 26. That is, the front member 11 forms a recess 29 which has the vertical wall 26, formed flat in an up-down direction, as a bottom and is shallow in a front-rear direction.

As shown in FIG. 2, the rear member 12 has a beam body 23 formed to correspond to a protruding portion of the hat shape, being open forward and closed at a rear end thereof, an upper flange 24 formed to correspond to a brim portion of the hat shape and extending upward from an upper open end of the beam body 23, and a lower flange 25 formed to correspond to a brim portion of the hat shape and extending downward from a lower open end of the beam body 23. The beam body 23 of the rear member 12 is formed, at a rear thereof, with beads 23a extending in the vehicle width direction (perpendicular to a plane of paper in FIG. 2) and being convex rearward. The beads 23a are formed to be a pair of upper and lower beads at the rear end of the beam body 23.

As shown in FIG. 2, the upper and lower flanges 24, 25 of the rear member 12 are formed to correspond to, and joined as described above with, the upper and lower walls 27, 28 of the front member 11, respectively. In addition, the upper and lower flanges 24, 25 respectively have turned portions 24a, 25a bent and extending rearward on the way of extending upward and downward, respectively, from the beam body 23. A hooking portion 14 of the absorber 3 (see FIG. 3) is engaged with an upper end and a lower end of the bumper beam 12, where the turned portions 24a, 25a are formed, to attach an absorber-sensor-unit assembly 30 (see FIG. 4) to the bumper beam 2, as described below.

Note that a reference sign 9 indicates an extension in FIGS. 1 and 2. The extension 9 is formed of a substantially square cylinder extending rearward from a rear surface at either end of the bumper beam 2, as shown in FIG. 1. The extension 9 is connected to front ends of a front side frame and a side member, which are not shown, via a connection plate 9a. This allows the extension 9 to transmit a collision load inputted to the bumper beam 2 to the front side frame, as a vehicle body frame, and the like.

<<Absorber>>

As shown in FIG. 1, the absorber 3 includes an absorber body 13 formed in front of the bumper beam 2 so as to run along the bumper beam 2, the hooking portion 14 located off the center toward an end in the vehicle width direction of the absorber body 13 and formed to be one with the absorber body 13, and a sensor mount 15 formed to be one with the absorber body 13 so as to extend downward from an end in the vehicle width direction of the absorber body 13.

As shown in FIG. 1, the absorber body 13 is in a substantially bow shape, convex forward in a planar view. That is, the absorber body 13 extends substantially linearly at the center in the vehicle width direction and is gradually displaced rearward from the center toward an outer side in the vehicle width direction so as to correspond to the bumper beam 2.

As shown in FIG. 2, the absorber body 2 is an elongated member, in a cross-sectional view intersecting in the vehicle width direction (perpendicular to a plane of paper in FIG. 2), with a front portion 33 having a vertical width substantially equal to that of the extension 9, to be described below, formed to be one with a rear portion 32 having a vertical width substantially equal to that of the vertical wall 26 of the front member 11 of the bumper beam 2.

The absorber body 13 is formed, on a rear end surface of the rear portion 32, with a mount portion 31 for the pressure tube 5 (hereinafter, sometimes referred to as the tube mount portion 31). This tube mount portion 31 is formed so as to be raised rearward from a general surface 32a, which occupies majority of the rear end surface of the absorber body 13. The tube mount portion 31 is formed with a tube insertion groove 31a extending in the vehicle width direction. The tube mount portion 31 in the present embodiment is formed at an upper portion of the rear end surface of the rear portion 32 of the absorber body 13.

As shown in FIG. 2, the hooking portions 14 are provided in a pair at a top and a bottom of the absorber body 13 so as to respectively correspond to the turned portions 24a, 25a of the upper and lower flanges 24, 25 of the bumper beam 2. As shown in FIG. 1, the hooking portion 14 has a loop-shaped support portion 14a extending rearward from the absorber body 13 and a protrusion 14b protruding from the support portion 14a toward the bumper beam 2. The hooking portions 14 have the protrusions 14b hooked onto the turned portions 24a, 25a, as shown in FIG. 2, to cause the absorber body 13 to be supported by the bumper beam 2. The pair of upper and lower hooking portions 14 are provided at each of two positions, one on the right and the other on the left, corresponding to the extensions 9, as shown in FIG. 1.

The absorber body 13, which is supported by the bumper beam 2 at the hooking portions 14 as described above, has the rear end of the rear portion 32 thereof fitted into the recess 29 of the bumper beam 2, as shown in FIG. 2. This causes the tube mount portion 31 of the pressure tube 5 to contact the vertical wall 26 of the bumper beam 2. Then, the general surface 32a of the rear end surface of the absorber body 13 is separated from the vertical wall 26 at a predetermined distance. In addition, stepped surfaces 34 formed between the front portion 33 and the rear portion 32 of the absorber body 13 respectively face the upper wall 27 and lower wall 28 of the front member 11 of the bumper beam 2 at predetermined distances.

As shown in FIG. 1, the sensor mount 15 is formed of a block body connected to a bottom surface, at an end in the vehicle width direction, of the absorber body 13. The sensor mount 15 is described in detail, together with the absorber-sensor-unit assembly 30 (see FIG. 4) to be described below. Note that the absorber 3 of the present embodiment is assumed to be one formed of resin foam such as urethane foam resin.

<<Pressure Tube and Pressure Sensor>>

Figure 3:
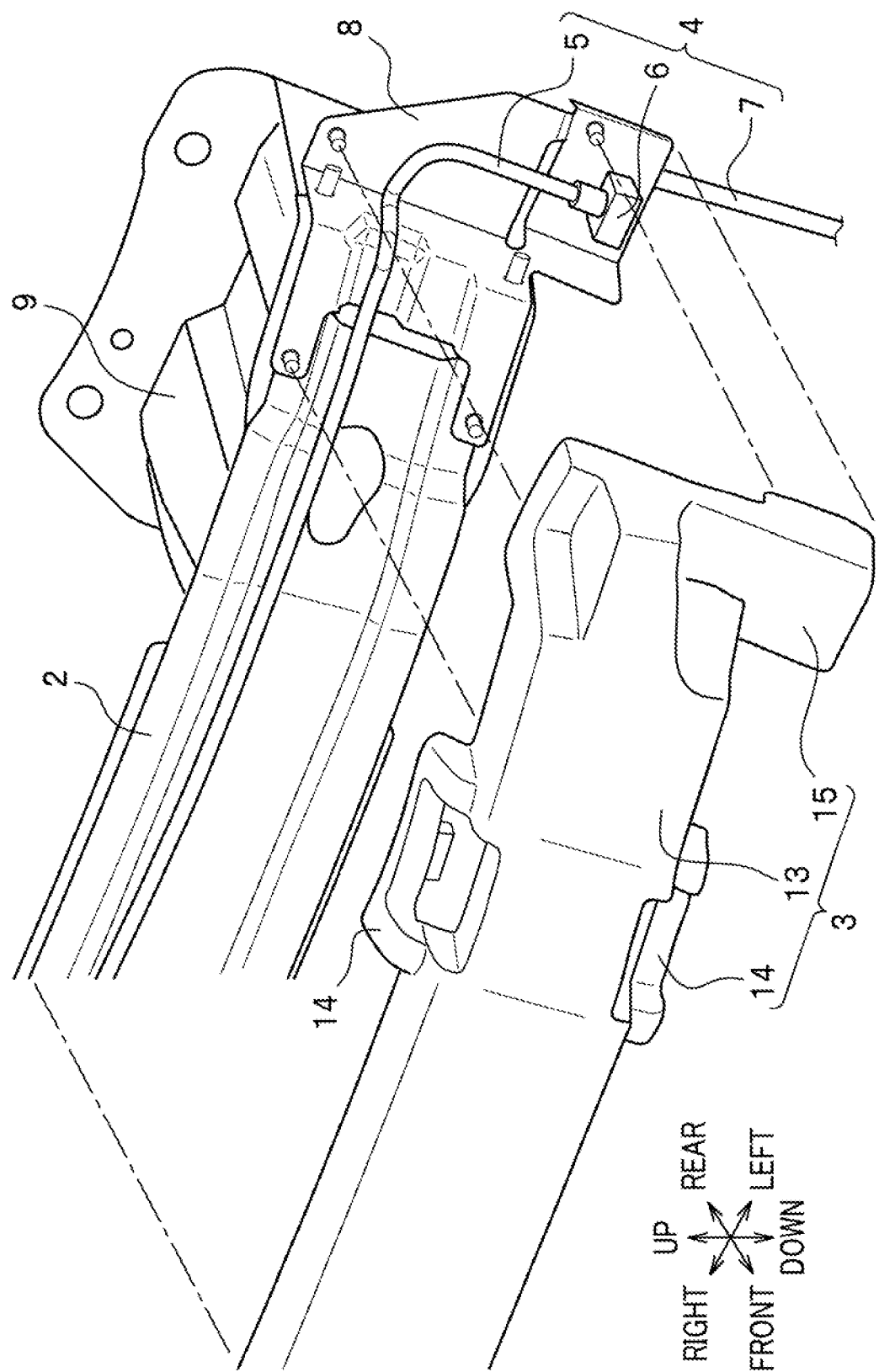
FIG. 3 is an exploded perspective view of a left end in a vehicle width direction of the pressure sensor layout structure.

Next, a description is given of the pressure tube (see FIG. 1) and the pressure sensor 6 (see FIG. 1). FIG. 3 is an exploded perspective view of a left end in a vehicle width direction of the pressure sensor layout structure 1 in FIG. 1. The pressure tube 5 is arranged so as to extend in the vehicle width direction (right-left direction in FIG. 3) between the bumper beam 2 and the absorber 3, as shown in FIG. 3. In particular, the pressure tube 5 is fitted in, and supported by, the tube insertion groove 31a formed in the tube mount portion 31, as shown in FIG. 2.

The pressure tube 5 of the present embodiment is assumed to be one formed of elastic resin material such as synthetic rubber. The pressure tube 5 has a pressure transmitting medium, such as air, sealed in a hollow thereof. When a collision load has been inputted to the absorber body 13 in FIG. 2, the pressure tube 5 has a cross-sectional shape of the hollow changed by the vertical wall 2 of the bumper beam 26. This causes the pressure tube 5 to have the pressure in the hollow increased in proportion to the magnitude of the collision load. The pressure transmitting medium in the pressure tube 5 transmits the pressure change in the hollow of the pressure tube 5 to the pressure sensor 6 in FIG. 3, which is mounted at the end of the pressure tube 5.

The pressure sensor 6 (see FIG. 3) of the present embodiment has a substantially rectangular shape. The pressure sensor 6 converts a pressure change generated in the hollow of the pressure tube 5 into an electrical signal (detection signal) and outputs the detection signal to an electronic control unit, not shown, via a harness 7 connected to the pressure sensor 6. The electronic control unit calculates a collision load, effective mass of the collided object, and the like, based on the detection signal. Based on the results of the calculation, the electronic control unit determines whether or not to output a deployment command to an airbag for a pedestrian, for example, so as to be deployed on an engine hood.

A sensor unit 4 having the pressure sensor 6, the pressure tube 5 and the harness 7, and the sensor cover 8 are attached to the absorber 3, as shown in FIG. 3, to compose the absorber-sensor-unit assembly 30 (see FIG. 4), to be described next. Note that the reference sign 9 in FIG. 3 indicates the extension to be joined to the rear surface of the bumper beam 2.

<<Absorber-Sensor-Unit Assembly>>

Figure 4:
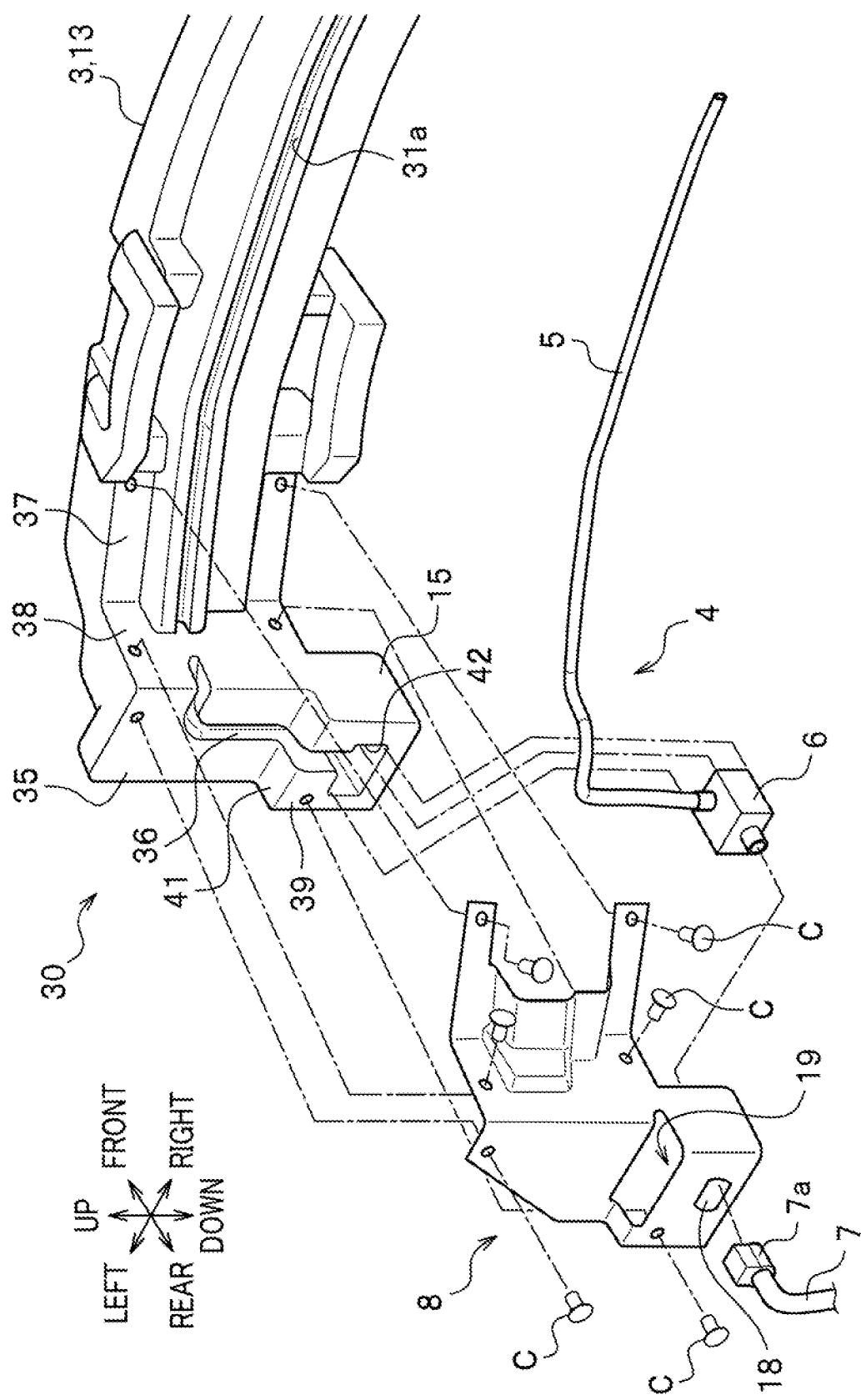
FIG. 4 is an exploded perspective view of an absorber-sensor-unit assembly of the pressure sensor layout structure.

Next, the absorber-sensor-unit assembly 30 is described (see FIG. 4). FIG. 4 is an exploded perspective view of the absorber-sensor-unit assembly 30. When the absorber-sensor-unit assembly 30 is constructed, the sensor unit 4, except the harness 7 and a connector 7*a*, is first attached to the absorber 3, as shown in FIG. 4.

In particular, the pressure tube 5 is inserted into the tube insertion groove 31*a* of the absorber body 13. Then, the pressure sensor 6 is inserted and fitted into a hole 42 formed in the sensor mount 15, which is located lower than the absorber body 13. Incidentally, a block body, in a substantially rectangular shape, of the sensor mount 15 is positioned so as to be offset rearward from a rear surface 35 of an end portion of the absorber body 13.

This forms a stepped surface 41 between a rear surface 39 of the sensor mount 15 and the rear surface 35 of the absorber body 13. In addition, a groove 36 is formed from the sensor mount 15 to the end portion of the absorber body 13. The groove 36 is to have the pressure tube 5, extending from the pressure sensor 6 arranged in the hole 42, fitted therein.

The sensor cover 8 is composed of a bent plate body. The sensor cover 8 of the present embodiment extends from the rear surface 39 of the sensor mount 15 to the stepped surface 41 of the sensor mount 15, the rear surface 35 of the end portion of the absorber body 13, an inner side surface 38 of the end portion of the absorber body 13, and a back surface 37 of the absorber body 13.

That is, the sensor cover 8 is bent so as to follow the rear surface 39 of the sensor mount 15, the stepped surface 41 of the sensor mount 15, the rear surface 35 of the end portion of the absorber body 13, the inner side surface 38 of the end portion of the absorber body 13, and the back surface 37 of the absorber body 13. In addition, the sensor cover 8 is formed with a hole 19 at a portion corresponding to the stepped surface 41 of the sensor mount 15. Further, the sensor cover 8 is formed with a hole 18 for connecting the connector 7*a* of the harness 7 with the pressure sensor 6 arranged in the hole 42 of the sensor mount 15.

The sensor cover 8 as described above is fixed by clips C to the absorber 3 at two or more positions which are located variously in the vehicle width direction of the absorber 3. The sensor cover 8 is fixed to the absorber 3 only. Having the connector 7*a* of the harness 7 connected with the pressure sensor 6 via the hole 18 completes the absorber-sensor-unit assembly 30.

Figure 5:
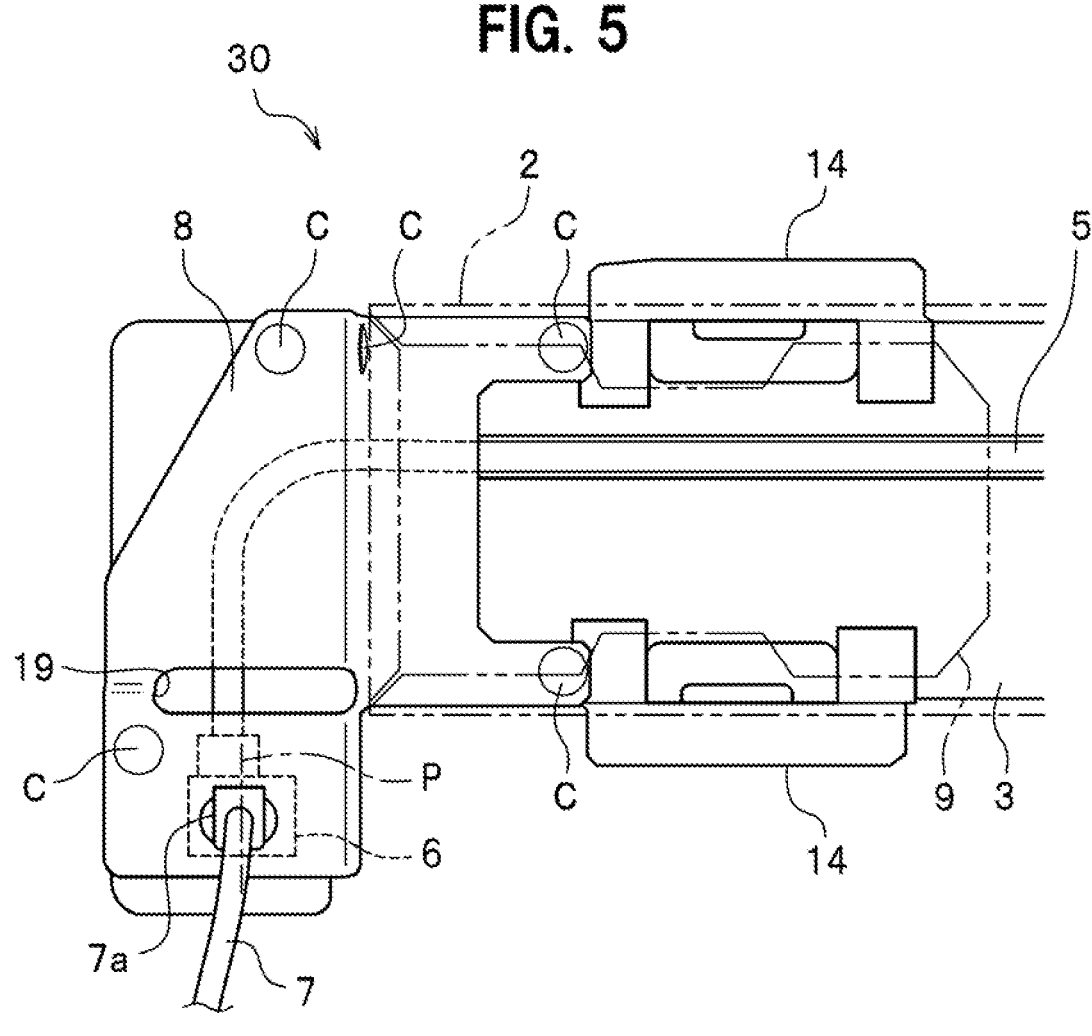
FIG. 5 is a rear view of the absorber-sensor-unit assembly.

FIG. 5 is a partial rear view of the absorber-sensor-unit assembly 30 on the left side. Note that FIG. 5 shows arranged positions of the bumper beam 2 and the extension 9 by imaginary lines (dash-dot-dot-dash lines).

Having the hooking portions 14 of the absorber 3 of the absorber-sensor-unit assembly 30 hooked to the bumper beam 2 forms the pressure sensor layout structure 1 (see FIG. 1) according to the present embodiment. In the pressure sensor layout structure 1 (FIG. 1) with the absorber-sensor-unit assembly 30 as described above, the pressure sensor 6 is positioned lower than the bumper beam 2 and the extension 9.

The sensor cover 8 extends more downward than the bumper beam 2 and the extension 9. The pressure sensor 6 is positioned outside in the vehicle width direction of the bumper beam 2, with the sensor cover 8 extending from the bumper beam 2 to the position of the pressure sensor 6. An end in the vehicle width direction of the sensor cover 8 is positioned outer in the vehicle width direction than an end in the vehicle width direction of the pressure sensor 6.

In addition, the sensor cover 8 is formed with the hole 19 so as to be adjacent to an upper portion of the pressure sensor 6. Further, the sensor cover 8 is fixed by the clips C to the absorber 3 at positions outer in the vehicle width direction than a center position P in the vehicle width direction of the pressure sensor 6. Moreover, the sensor cover 8 partially overlaps with the extension 9 via the bumper beam 2 and also partially overlaps with an outer side surface in the vehicle width direction of the extension 9, as shown in FIG. 3.

<<Advantageous Effects>>

Next, a description is given of advantageous effects of the pressure sensor layout structure 1 according to the present embodiment. The pressure sensor layout structure 1 has the sensor cover 8 fixed, at two or more positions which are located variously in the vehicle width direction, to the absorber 3 at the end portion in the vehicle width direction of the absorber 3. With the pressure sensor layout structure 1 as described above, the sensor cover 8 can avoid the end portion in the vehicle width direction of the absorber 3 from dropping off, even if the absorber 3 is broken at a time of an offset collision of the vehicle. The pressure sensor layout structure 1 allows the pressure sensor 6 to accurately and stably detect a pressure change in the pressure tube 5, even at a time of an offset collision of the vehicle.

A conventional pressure sensor layout structure (see Patent Document 1, for example) may have a risk of an end portion of an absorber being broken at a time of an offset collision of a vehicle, causing the pressure sensor to drop off. In contrast, the pressure sensor layout structure 1 of the present embodiment effectively prevents the pressure sensor 6 from dropping off by the sensor cover 8 provided at the end portion of the absorber 3, even if the absorber 3 is broken at a position outer in the vehicle width direction than the hooking portion 14.

In addition, the pressure sensor layout structure 1 has the sensor cover 8 fixed to the absorber 3 only. According to the pressure sensor layout structure 1 as described above, there is no need to provide mount holes in the bumper beam 2, unlike one having the sensor cover 8 fixed to the bumper beam 2, to facilitate mounting the sensor cover 8. Additionally, according to the pressure sensor layout structure 1 as described above, the absorber-sensor-unit assembly 30, having the absorber 3 and the sensor cover 8 fixed in advance, allows for improving efficiency of mounting the absorber 3, sensor unit 4, and sensor cover 8 to the bumper beam 2.

Further, the pressure sensor layout structure 1 has the pressure sensor 6 positioned lower than the bumper beam 2 and the extension 9. According to the pressure sensor layout structure 1 as described above, the pressure sensor 6 is prevented from being held between the bumper beam 2 or the extension 9 and another member at a time of a collision of the vehicle, and then broken.

Still further, the pressure sensor layout structure 1 has the sensor cover 8 extending more downward than the bumper beam 2 and the extension 9. According to the pressure sensor layout structure 1 as described above, the pressure tube 5 is prevented from being cut off by a lower edge of the bumper beam 2 or extension 9, when a collision load is applied to the absorber 3.

Still further, the pressure sensor layout structure 1 has the pressure sensor 6 positioned outside in the vehicle width direction of the bumper beam 2, and the sensor cover 8 extending from the bumper beam 2 to the position of the pressure sensor 6. According to the pressure sensor layout structure 1 as described above, the sensor cover 8 reliably prevents the end portion of the absorber 3 from dropping off, even if the absorber 3 has been broken at a time of an offset collision of the vehicle.

Still further, the pressure sensor layout structure 1 has the end in the vehicle width direction of the sensor cover 8 positioned outer in the vehicle width direction than the end in the vehicle width direction of the pressure sensor 6. According to the pressure sensor layout structure 1 as described above, the sensor cover 8, when a collision load is laterally inputted to the end portion of the absorber 3, protects the pressure sensor 6 from being directly applied with the load. This reliably prevents the pressure sensor 6 from being broken.

Still further, the pressure sensor layout structure 1 has the sensor cover 8 formed with the hole 19 so as to be adjacent to the upper portion of the pressure sensor 6. According to the pressure sensor layout structure 1 as described above, a stress of the sensor cover 8 is decreased around the hole 9, when a collision load is laterally inputted to the end portion of the absorber 3. The sensor cover 8 is thus prevented from being broken due to the load being concentrated at the sensor cover 8 locally.

Still further, the pressure sensor layout structure 1 has the sensor cover 8 fixed to the absorber 3 at positions outer in the vehicle width direction than the center position P in the vehicle width direction of the pressure sensor 6. According to the pressure sensor layout structure 1 as described above, the pressure sensor 6 is more reliably prevented from dropping off, even if the absorber 3 is broken at a time of an offset collision of the vehicle.

Figure 6:
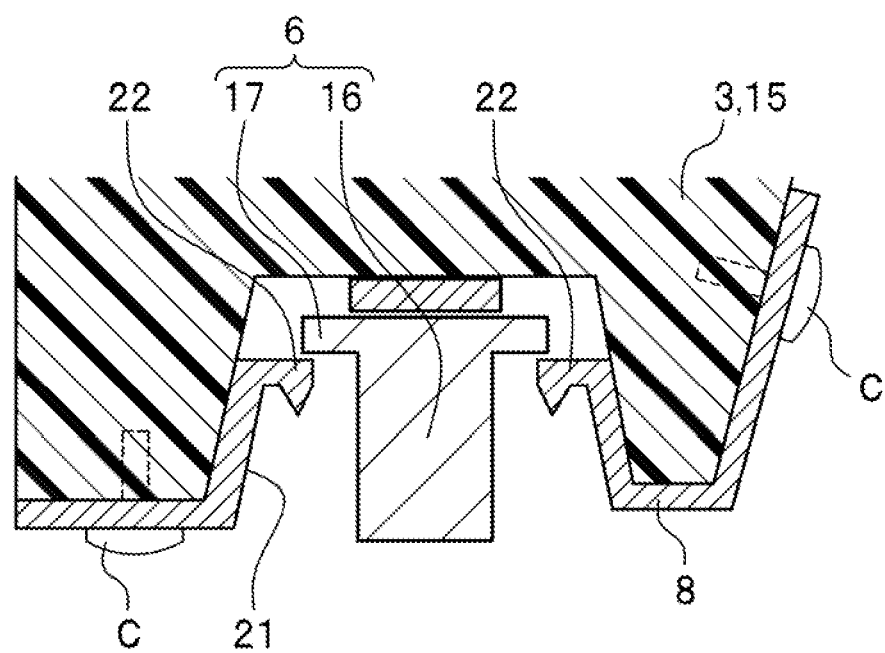
FIG. 6 is a diagram to illustrate another fixing aspect for a pressure sensor.

Hereinabove, the present embodiment has been described, but the present invention is not limited thereto and can be implemented in various forms. In the present embodiment, the pressure sensor 6 is assumed to be fixed in the hole 42 of the sensor mount 15 formed in the absorber 3, but a structure of fixing the pressure sensor 6 is not limited thereto. FIG. 6 is a diagram to illustrate another fixing structure for the pressure sensor 6, to indicate a structure of fixing the absorber-sensor-unit assembly 30 (see FIG. 4) on the left side.

As shown in FIG. 6, a fixing part 21 for the pressure sensor 6, formed in the sensor cover 8, is in a concave shape, which is open rearward. In this fixing structure, the pressure sensor 6 has a sensor body 16 and a flange 17 provided at one end of the sensor body 16. The fixing part 21 is formed with a pair of claws 22 to engage the flange 17 of the pressure sensor 6 fitted into the absorber 3. Note that a reference sign 15 in FIG. 6 indicates a sensor mount of the absorber 3, and reference signs C indicates the clips to fix the sensor cover 8 to the absorber 3.

According to the pressure sensor layout structure 1 as described above, the fixing part 21 for the pressure sensor 6, formed in the sensor cover 6, is in a concave shape and this facilitates the sensor cover 8 being bent, when a collision load is laterally inputted to the end portion of the absorber 3, to decrease a stress.

According to the pressure sensor layout structure 1 as described above, the fixing part 21 has the claws 22 to engage the pressure sensor 6 fitted therein, to facilitate attaching the pressure sensor 6 to the fixing part 21.

LIST OF REFERENCE SIGNS

1: pressure sensor layout structure, 2: bumper beam, 3: absorber, 5: pressure tube, 6: pressure sensor, 8: sensor cover, 9: extension, 19: hole formed in sensor cover, 21: fixing part for pressure sensor, and 22: claw for engaging pressure sensor.

What is claimed is:

1. A pressure sensor layout structure comprising:
a bumper beam;
an absorber disposed at a front of the bumper beam;
a pressure tube arranged between the bumper beam and the absorber;
a pressure sensor attached to an end of the pressure tube; and
a sensor cover fixed to a rear surface of the absorber, wherein
the sensor cover is fixed to an end portion in a vehicle width direction of the absorber, at two or more positions which are located variously in the vehicle width direction, and
the sensor cover is fixed to the absorber only.

2. A pressure sensor layout structure comprising:
a bumper beam;
an absorber disposed at a front of the bumper beam;
a pressure tube arranged between the bumper beam and the absorber;
a pressure sensor attached to an end of the pressure tube;
a sensor cover fixed to a rear surface of the absorber; and
an extension joined to a rear surface of the bumper beam at either end in the vehicle width direction of the bumper beam,
wherein
the sensor cover is fixed to an end portion in a vehicle width direction of the absorber, at two or more positions which are located variously in the vehicle width direction, and
the pressure sensor is positioned lower than the bumper beam and the extension.

3. The pressure sensor layout structure according to claim 2, wherein
the sensor cover extends more downward than the bumper beam and the extension.

4. A pressure sensor layout structure comprising:
a bumper beam;
an absorber disposed at a front of the bumper beam;
a pressure tube arranged between the bumper beam and the absorber;
a pressure sensor attached to an end of the pressure tube; and
a sensor cover fixed to a rear surface of the absorber, wherein
the sensor cover is fixed to an end portion in a vehicle width direction of the absorber, at two or more positions which are located variously in the vehicle width direction, the pressure sensor is positioned outside in the vehicle width direction of the bumper beam, the sensor cover extends from the bumper beam to a position of the pressure sensor, and a fixing part for the pressure sensor, formed in the sensor cover, is partly concave forward or rearward.

5. The pressure sensor layout structure according to claim 4, wherein an end in the vehicle width direction of the sensor cover is positioned outer in the vehicle width direction than an end in the vehicle width direction of the pressure sensor.

6. The pressure sensor layout structure according to claim 5, wherein the sensor cover is formed with a hole so as to be adjacent to an upper portion of the pressure sensor.

7. The pressure sensor layout structure according to claim 1, wherein the sensor cover is fixed to the absorber at positions outer in the vehicle width direction than a center position in the vehicle width direction of the pressure sensor.

8. The pressure sensor layout structure according to claim 4, wherein the fixing part is formed with a pair of claws to engage the pressure sensor fitted in the absorber.

* * * * *